United States Patent

Dobson, Jr. et al.

[11] Patent Number: 5,942,468
[45] Date of Patent: Aug. 24, 1999

[54] INVERT EMULSION WELL DRILLING AND SERVICING FLUIDS

[75] Inventors: James W. Dobson, Jr., Houston; James P. Cashion, Missouri City; William Max Duncan, CorpusChristi, all of Tex.

[73] Assignee: Texas United Chemical Company, LLC, Houston, Tex.

[21] Appl. No.: 09/076,061

[22] Filed: May 11, 1998

[51] Int. Cl.[6] ............................ C09K 7/06; C09K 7/00
[52] U.S. Cl. ........................ 507/136; 507/261; 516/30
[58] Field of Search ................................ 507/136, 261, 507/139, 266; 516/30

[56] References Cited

U.S. PATENT DOCUMENTS

| | | | |
|---|---|---|---|
| H1611 | 11/1996 | Patel | 507/139 |
| 3,127,343 | 3/1964 | Reddie et al. | 507/136 |
| 4,425,241 | 1/1984 | Swanson | 507/136 |
| 4,446,044 | 5/1984 | Rutkiewic et al. | 516/30 |
| 4,534,411 | 8/1985 | Morita et al. | 507/136 |
| 4,830,765 | 5/1989 | Perricone | 507/136 |
| 4,941,981 | 7/1990 | Perricone | 507/136 |
| 5,057,234 | 10/1991 | Bland et al. | 507/139 |
| 5,072,794 | 12/1991 | Hale et al. | 507/139 |
| 5,120,708 | 6/1992 | Melear et al. | 507/136 |
| 5,470,822 | 11/1995 | Younes | 507/136 |
| 5,633,220 | 5/1997 | Cawiezel et al. | 507/117 |
| 5,710,110 | 1/1998 | Cooperman et al. | 507/136 |

*Primary Examiner*—Philip Tucker
*Attorney, Agent, or Firm*—Roy F. House

[57] ABSTRACT

Disclosed are invert oil emulsion drilling fluids in which the internal aqueous phase contains one or more water soluble polyethylene glycols dissolved therein. The fluids are characterized by an elevated low shear rate viscosity, hence excellent suspension properties, an elevated Shear Thinning Index, hence excellent drilling characteristics, and a high shale stability index, hence excellent cuttings stabilization and formation protection. Preferred polyethyleneglycols have a molecular weight from about 500 to about 10,000, preferably from about 1000 to about 10,000. Preferred fluids contain from about 5% to about 40% by weight of the polyethyleneglycol in the aqueous phase, most preferably from about 10% to about 30% by weight. Also disclosed is a method of enhancing the thermal stability of invert emulsion well drilling and servicing fluids which comprises dissolving in the aqueous phase thereof one or more polyethyleneglycols.

19 Claims, No Drawings

INVERT EMULSION WELL DRILLING AND SERVICING FLUIDS

BACKGROUND OF THE INVENTION

This invention relates to invert oil emulsion well drilling and servicing fluids. In particular, the invention relates to invert oil emulsion well drilling and servicing fluids in which the internal aqueous phase contains a water soluble polyglycol dissolved therein, the fluids having good anti-settling properties as evidenced by an elevated low shear rate viscosity.

As is well known in the art, invert emulsion oil based well drilling and servicing fluids, generally called "muds", are water-in-oil emulsions that typically contain an organophilic clay viscosifier/suspension additive, and a weighting agent. The water phase is usually a solution of a salt, such as calcium chloride or sodium chloride, whose concentration is normally adjusted such that the aqueous activity of the fluid is equal to or less than the aqueous activity of the subterranean formations contacted by the fluids. This minimizes transfer of water to water-sensitive formations and maintains a stable wellbore.

The invert emulsion is usually stabilized with a "primary emulsifier", often a fatty acid or salt thereof, while the weighting material and the solids the fluid acquires during use are made oil-wet and dispersed in the fluid with a "secondary emulsifier", typically a strong wetting agent such as a polyamide, amido-amine (partial amide of a polyamine), and the like.

In recent years, environmental concerns over the effect of invert emulsion fluids on plant and animal life has led to the development of more environmentally-friendly fluids. Thus the oleaginous exterior phase of the fluids may be a so-called nontoxic and/or biodegradable hydrocarbon oil with low aromatic content, an ester, an ether, a synthetic hydrocarbon such as a polyalphaolefin, an internal olefin, and the like. However, the internal phase comprising aqueous solutions of calcium chloride and/or other halide salts are toxic to plant life.

Concern has been expressed by environmentalists and others with the possibility of polluting underground water supplies, damaging soil productivity and diminishing surface water quality. In a conference sponsored by the Environmental Protection Agency in May of 1975 in Houston, Tex., the effects of both techniques and chemicals used in drilling fluids and their impact on the environment were discussed. The outlook for landfill disposal of oil-base drilling fluids was not good. Such muds were thought to be toxic and the effects long-term. The toxic effect of oil-base muds on the soil was thought to be inherent in the chemicals used. Thus, known oil-base drilling fluids using a calcium chloride internal phase have adverse environmental consequences when used for land drilling operations.

Preferably, land farming could be used to dispose of both drilling fluids and the cuttings produced at a land drilling operation. And, the land farm would ideally be located near the site of the drilling operation. It should be appreciated that the cuttings contain an amount of drilling fluids. In land farming, the spent drilling fluids and cuttings would be spread over a section of land and plowed into the ground using standard agricultural methods. Drilling fluids using chloride solutions in their internal phases have proven too toxic to be acceptably disposed of by land farming, however.

Environmental regulations also restrict the concentration of halides, nitrates, sulfates and phosphates in drilling fluids used for land drilling operations. Thus, there is a need for oil-base drilling fluids having a composition that will comply with environmental regulations and will be environmentally compatible with land disposal methods.

PRIOR ART

U.S. Pat. No. 5,072,794 (Hale et al.) and U.S. Pat. No. 5,198,416 (Hale et al.) discloses invert emulsion drilling fluids wherein the internal aqueous phase contains at least about 30% by weight of the internal phase of an alcohol containing less than 8 hydroxyl groups and less than 16 carbon atoms.

U.S. Pat. No. 5,633,220 (Cawiezel et al.) discloses invert emulsion fracturing fluids in which the internal phase may be glycols such as ethylene glycol, diethylene glycol, propylene glycol, dipropylene glycol, and the like.

U.S. Pat. No. 5,057,234 (Bland et al.) discloses brine-in-glycol emulsions where the internal phase is a salt solution and the external phase is a non-hydrocarbon, non-mineral oil, glycol which is not soluble in the aqueous phase. The preferred glycols are selected from the group consisting of polypropylene glycols, polypropylene glycol ethers, and propylene oxide polymeric adducts of alcohols, having molecular weights from about 60 to 1000, most preferably about 250 to 1000. Included are condensates of propylene oxide and optionally ethylene oxide with alcohols.

U.S. Pat. No. 4,425,241 (Swanson) discloses the use of a polyethylene glycol having a molecular weight from about 6,000 to about 20,000 in conjunction with at least one water dispersible polymeric viscosifier to decrease the filtrate loss from water base drilling muds, particularly in hard brine environments.

U.S. Pat. No. 4,830,765 (Perricone et al.) and U.S. Pat. No. 4,941,981 (Perricone et al.) disclose the use of a water soluble component selected from the group consisting of polyhydric alcohols, glycol, glycol ethers, polypropylene glycols, polyethylene glycols, ethylene oxide-propylene oxide copolymers ("EO-PO") alcohol-initiated EO-PO copolymers, and mixtures thereof in water base drilling fluids.

U.S. Pat. No. 5,710,110 (Cooperman et al.) provides an extensive background of the characteristics and uses of drilling fluids and discloses compositions and methods of improving the anti-settling characteristics of drilling fluids by enhancing the low shear rate viscosity of such fluids.

U.S. Pat. No. 5,470,822 (Younes) discloses invert emulsion fluids wherein the external (continuous) phase comprises a polymer or blend of polymers, each polymer having a polyoxyalkylene core having 2 to 3 end groups, each end group being selected from the group consisting of hydroxyl, C6–C30 acyloxy, and C6–C30 alkanamido, with the proviso that 50% or more of the total number of end groups are C6–C30 acyloxy and/or C6–C30 alkanamids. The polyoxyalkylene core has an average molecular weight from about 150 to about 1500.

U.S. Pat. No. 5,494,120 (Hale et al.) discloses the use of methyl glycoside solutions as the internal phase of invert oil emulsion well drilling fluids.

U.S. Pat. No. 5,710,107 (Walker) discloses the use of alkyl glycoside solutions as the internal phase of invert oil emulsion well drilling fluids.

SUMMARY OF THE INVENTION

The primary purpose of the present invention is to provide an invert oil emulsion well drilling and servicing fluid, and process for the use thereof, which contains no or a low concentration of dissolved water soluble salt in the internal aqueous phase, and which exhibits enhanced anti-settling characteristics as evidenced by the elevated low shear rate viscosity thereof. Additionally, the fluids of the invention exhibit decreased toxicity as compared to inorganic salt containing invert emulsion fluids, and generally decreased high shear rate viscosity. Thus the fluids are characterized as having excellent shear thinning characteristics as disclosed hereinafter and enhanced thermal stability.

The invention also provides a method of increasing the thermal stability of a water-in-oil emulsion well drilling and servicing fluid which comprises dissolving in the aqueous phase of the fluid a polyethyleneglycol in an amount sufficient to increase the low shear rate viscosity and Shear Thinning Index of the fluid upon heating the fluid at elevated temperatures.

While the invention is susceptible to various modifications and alternative forms, specific embodiments thereof will hereinafter be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

The compositions can comprise, consist essentially of, or consist of the stated materials. The method can comprise, consist essentially of, or consist of the stated steps with the stated materials.

DESCRIPTION OF PREFERRED EMBODIMENTS

Applicants have discovered that the use of water soluble polyethylene glycols having a molecular weight greater than about 500 dissolved in the aqueous phase of invert oil emulsion well drilling and servicing fluids provides certain advantages as compared to prior art fluids. Removal of the water soluble salt dissolved in the internal aqueous phase decreases the toxicity of the fluids. At the same time, the polyethylene glycol decreases the aqueous activity of the fluid and thus enables the aqueous activity to be varied, as desired and as the aqueous activity of the formations contacted by the fluid dictate, by varying the concentration of the polyethylene glycol in the internal aqueous phase. The polyethylene glycol imparts superior anti-settling characteristics to the fluid as evidenced by the elevated low shear rate viscosity and enhanced Shear Thinning Index of the fluid.

Moreover, the fluids are more thermally stable than prior art fluids containing high concentrations of water soluble salts dissolved in the internal aqueous phase as evidenced by the change in the low shear rate viscosity and the Shear Thinning Index of the fluids on heating at elevated temperatures.

The fluids of the invention have excellent shale stabilizing characteristics as evidenced by the Shale Stability Index of the fluids. Moreover, it is believed that the polyethyleneglycol will provide shale stabilizing characteristics by adsorption onto shales in the event that the aqueous phase contacts a subterranean shale-containing formation.

Additives which are currently available in the industry, such as emulsifiers, wetting agents, weighting agents, fluid loss control additives, dispersants and the like, are applicable in the new fluid systems of this invention.

Oils suitable for use with the invention may be selected from any known oleaginous liquids having a high flash point such as mineral oil, diesel oil, other petroleum fractions, synthetic esters, synthetic ethers, synthetic hydrocarbons such as internal olefins, polyalphaolefins, and the like. Preferred are environmentally acceptable oils with low toxicity.

The emulsifiers useful in this invention may be the same emulsifiers generally used in water-in-oil invert drilling fluids. These include the various fatty acid soaps, including oxidized tall oil soaps, preferably the calcium soaps whether pre-formed or prepared in-situ in the fluid, polyamides, alkylamidoamines, imidazolines, alkyl sulfonates, fatty acyl esters, lecithin, and the like. These include so-called primary emulsifiers, secondary emulsifiers. See for example the following U.S. Pat. Nos.: 2,876,197; 2,994,660; 2,962,881; 2,816,073; 2,793,996; 2,588,808; 3,244,638; 4,504,276; 4,509,950; 4,776,966; and 4,374,737.

Weighting agents as is known in the art can be incorporated in the fluids of this invention. Exemplary weighting agents or weight materials include barite, galena, ilmenite, iron oxide, siderite, calcite, and the like.

Any of the typically used suspending agents known in the industry can be used. The preferred suspending agent is an organophilic clay (organoclay). Exemplary organoclays are set forth in the following U.S. patents, all incorporated herein by reference: U.S. Pat. Nos. 2,531,427; 2,966,506; 4,105,578; 4,208,218. U.S. Pat. No. 5,021,170 discloses mixtures of an organoclay and a sulfonated ethylene/propylene/5-phenyl-2-norborene terpolymer. Preferred organoclays are dimethyldi(alkyl)ammonium bentonite, dimethyldi(alkyl)ammonium hectorite, methylbenzyldi (alkyl)ammonium hectorite, and mixtures thereof.

Any of the typically used fluid loss control additives known in the industry can be used, such as gilsonite, asphalt, oxidized asphalt, organophilic lignites, and the like. Exemplary organophilic lignites are set forth in the following U.S. Pat. Nos.: 3,168,475 (Jordan et al.); 3,379,650 (Beasley et al.); 3,494,865 (Andrews et al.); 4,421,655 (Cowan); 4,597,878 (House et al.); 4,853,465 (Cowan et al.).

Various other known additives may also be employed in the fluids of this invention, if necessary or desired. For example, other oil wetting agents, corrosion inhibitors, scale inhibitors, and other common additives.

The water soluble polyethylene glycols useful in the fluids of this invention have a molecular weight of at least about 500, preferably at least about 1000, and most preferably in a range from about 1000 to about 10000.

The concentration of polyethyleneglycols present in the aqueous phase will be sufficient to increase the low shear rate viscosity of the fluid, to increase the Shear Thinning Index of the fluid, and to increase the thermal stability of the fluid. Generally a concentration from about 5% to about 40% of the combined weight of water and polyethylene glycol in the aqueous phase will be sufficient, preferably from about 7.5% to about 35%, most preferably from about 10% to about 30%.

It is well known that certain aqueous-base biopolymer-containing fluids are shear thinning, exhibiting a high low shear rate viscosity and a low high shear rate viscosity. A near zero shear rate (0.06 to 0.11 $\sec^{-1}$) viscosity provides a numerical value related to the ability of a fluid to suspend particles or cuttings under static conditions. Conversely, viscosity measured at shear rates above 20 $\sec^{-1}$ relates to the hole cleaning capacity of a fluid under annular flow conditions. Such fluids have been eminently successful for use in high angle and horizontal drilling. See for example: (1) "Drill-In Fluids Improve High-Angle Well Production", Supplement to Petroleum Engineer International, March, 1995, p. 5–11; and (2) "Soluble Bridging Particle Drilling System Generates Successful Completions in Unconsolidated Sand Reservoirs", J. Dobson and D. Kayga, presented at the 5$^{th}$ International Conference on Horizontal Well Technology, Amsterdam, The Netherlands, July 14–16, 1993.

As disclosed in Cooperman et al. U.S. Pat. No. 5,710,110, these characteristics are also desirable in oil base fluids. The polyethyleneglycols disclosed herein increase the low shear rate viscosity (LSRV) and increase the shear thinning characteristics of the invert emulsion fluids of the invention.

The Shear Thinning Index (STI) disclosed herein for determining the shear thinning characteristics of the fluids is calculated using the formula $$STI = \frac{(3 \text{ rpm Dial Reading})(100)}{(300 \text{ rpm Dial Reading})}$$

wherein the Dial Reading is obtained using a viscometer of the Fann-type as set forth in API Recommended Practice 13 B-1. Thus the STI can be readily determined by those skilled in the art.

The LSRV and STI of the fluids of this invention should be at least 10,000 centipoise and 10 respectively, preferably at least 20,000 centipoise and 15 respectively, most preferably at least 30,000 centipoise and 20 respectively.

The aqueous phase can additionally contain water soluble salts dissolved therein provided their concentration is insufficient to "salt out" or render insoluble the polyethyleneglycol in the aqueous phase. Exemplary water soluble salts include: the chloride, bromide, acetate, and formate salts of the alkali metals, particularly sodium and potassium; the chloride bromide, acetate, and formate salts of calcium; zinc bromide; and the like, all as is well known in the art.

The fluids may be prepared as in standard in the art. Thus the polyglycol may be added to the invert emulsion fluid and thereafter dissolved in the aqueous phase, or the polyethyleneglycol can be dissolved in the aqueous liquid before emulsification in the oil. Generally the suspension additive is dispersed in the oleaginous phase followed by the emulsifiers before the addition of the aqueous liquid.

The fluids of the invention generally will have an oil to water (O/W or oil:water) volume ratio of from about 40:60 to about 95:5, preferably from about 60:40 to about 95:5, most preferably from about 60:40 to about 85:15.

The invention will be understood in light of the following specific examples, which are merely illustrative and should not be construed as limiting the invention in any respect, as will be evident to those skilled in the art.

In these examples and this specification, the following abbreviations may be used: API=American Petroleum Institute; bbl=42 gallon barrel; ppg=pounds per gallon; gal= gallon; m$^3$=cubic meters; °F.=degrees Fahrenheit; %=percent; kg/m$^3$=kilogram per cubic meter; PV=API plastic viscosity in centipoise; YP=API yield point in pounds per 100 square feet; 10"/10' Gels=10 second/10 minute gel strengths in pounds per 100 square feet; STI=Shear Thinning Index; LSRV=Brookfield low shear rate viscosity at 0.3 revolutions per minute, 0.06 sec$^{-1}$ in centipoise; SSI=Shale Stability Index; PEG=Polyethylene Glycol; M.W.= molecular weight; vol.=volume; O/W=oil/water ratio, vol/ vol; ml=milliliters; g=grams; lbm=pounds; cp=centipoise; ft=feet; rpm=revolutions per minute; ES=emulsion stability, volts; psi=pounds per square inch; mm=millimeter; pvc= polyvinylchloride; HTHP=high temperature, high pressure fluid loss at 65.6° C. (150° F.), milliliters.

The plastic viscosity, yield point, and gel strengths were obtained by the procedures set forth in API's Recommended Practice 13B-1. The LSRV was obtained for the fluids using a Brookfield Model LVTDV-I viscometer having a number 2 or 3 spindle at 0.3 revolutions per minute (shear rate of 0.063 sec$^{-1}$). The LSRV is indicative of the suspension properties of the fluid, the larger the LSRV, the better is the suspension of solids in the fluid. The Shale Stability Index is obtained using the following procedure:

Shale Core Preparation:

1. Add 10.0 grams of salt to 300 ml of tap water in a Waring blender and stir until dissolved.
2. Add 100.0 grams of Pierre shale to the NaCl slurry.
3. Shear the slurry on the Waring blender for 4 minutes.
4. Set up a double-ended cement cell with filter paper and a coarse screen. Pour the slurry into the cell and place a piston onto the slurry. Place the cell in an HTHP heating jacket at room temperature, and apply 1000 psi to the slurry to filter the liquid portion. The cell needs to remain on for a minimum of 48 hours.
5. Remove the reconstituted shale core from the cell. Break the core down into 19.0 and 19.5 gram samples.
6. Fit a small piece of filter paper to both sides of the shale in a Carver press die assembly and then press at 20,000 psi. Remove the core from the assembly and place in 1⅛ inch pvc plugs (core holder).
7. Press the core into the pvc plugs on the Carver press at 1000 psi.
8. Shave the excess shale off the tope of the cores.
9. Place the shale cores into an oven at 150° F. for 4 hours.
10. Place the cores in a desiccator containing saturated sodium formate with a relative humidity between 60% and 63%. The samples are left in the desiccator for a minimum of 48 hours.

SSI Values:

1. The shale cores are removed from the dessicator and placed on the base of a penetrometer. The cone and the depth gauge of the penetrometer are lowered 38 mm (380 rds) to near the top of the core sample. A UNIVERSAL PRECISION Penetrometer with a 25 mm width, 2.77 mm length, 45 g cone is used.
2. The cone is set with the adjustment screw assembly to become flush with the surface of the core. The shale is now zeroed with the cone. The cone and the depth gauge are raised to the top position.
3. The lever (clutch) is then released, dropping the cone. The depth gauge is lowered until the gauge stops and the dial reading is recorded. This procedure is repeated twice more, and the average of the three readings are calculated. This is the initial penetration depth.
4. A fluid sample is prepared.
5. The core sample is attached to a jar lid with silicone and aged a minimum of 15 minutes for the silicone to cure.
6. The fluid sample is added to a jar and the jar lid with the core is screwed on tightly. The jar is placed in a roller oven at 150° F. for 16 hours.
7. The sample is removed from the roller oven and kept inverted so the shale remains submersed in the fluids until the samples have cooled.
8. The jar lid with the attached core is placed on the base of the penetrometer. A paper towel is used to blot off any excess fluid on top of the core sample.
9. Steps 1–3 are repeated to determine the final penetration depth.

10. The formula for SSI values is as follows:

$$\frac{(210 - \text{final penetration depth})}{(210 - \text{initial penetration depth})}(100)$$

Note: 210 is the penetration depth obtained by treating the core sample in deionized water.

EXAMPLE 1

Invert oil emulsion fluids were prepared having an internal olefin oleaginous continuous phase, a dispersed, emulsified aqueous phase and commercially available organophilic clay suspending agent/viscosifier, emulsifiers, lime and barite. The fluids had the composition set forth in Table 1. The aqueous phase contained the concentrations of polyethyleneglycol set forth in Table 1. The molecular weight of the polyethyleneglycols evaluated is set forth in Table 1. For Comparative purposes, a fluid was prepared in which the aqueous phase contained 28 percent by weight of calcium chloride (10.5 ppg solution).

The fluids were evaluated for API rheology, low shear rate viscosity, emulsion stability, and shale stability index. The data obtained are set forth in Table 1.

EXAMPLE 2

Invert oil emulsion fluids were prepared having an internal olefin oleaginous continuous phase as in Example 1. The concentrations of the emulsifiers were varied as indicated in Table 2. The aqueous phase was a solution containing 12.5% by weight of a polyethyleneglycol of molecular weight 8000. The data obtained are set forth in Table 2.

EXAMPLE 3

Fluids were prepared as in Example 1 and evaluated for API rheology at 48.9° C. (120° F.) and low shear rate viscosity. The data obtained are set forth in Table 3A. Thereafter the fluids were hot rolled at 65.6° C. (150° F.) for 16 hours, cooled, and evaluated for the API rheology at 48.9° C., low shear rate viscosity, emulsion stability, shale stability index, and the API high temperature, high pressure (500 psi differential) fluid loss through a 5 micrometer disk saturated with the oil. The data obtained are set forth in Table 3B.

Comparison of the low shear rate viscosity and Shear Thinning Index of the fluids before and after hot rolling at 65.6° C. illustrates the enhanced thermal stability of the fluids of the invention and exemplifies the method of the invention.

TABLE 1

Fluid Composition: 225.4 ml Biobase internal olefin; 6 g of Synvert organophilic clay viscosifier; 5.5 ml Synvert I emulsifier; 3.7 ml Synvert II oil wetting agent; 3 g FLG fluid loss additive; 65.1 ml Internal aqueous phase; 4 g lime; and 250 g barite

| Fluid | Comparative A | 1-1 | 1-2 | 1-3 | 1-4 |
|---|---|---|---|---|---|
| Aqueous Phase | | | | | |
| CaCl2, %[1] | 28 | 0 | 0 | 0 | 0 |
| PEG, %[1] | 0 | 12.5 | 22.2 | 22.2 | 6.6 |
| PEG, MW | 0 | 8000 | 1450 | 3350 | 8000 |
| Fann Rheology | | | | | |
| 600 rpm | 92 | 65 | 93 | 65 | 82 |
| 300 rpm | 54 | 41 | 65 | 39 | 54 |
| 200 rpm | 42 | 31 | 53 | 30 | 42 |
| 100 rpm | 26 | 22 | 40 | 20 | 31 |
| 6 rpm | 7 | 9 | 19 | 8 | 12 |
| 3 rpm | 5 | 8 | 18 | 7 | 10 |
| PV | 38 | 24 | 28 | 26 | 28 |
| YP | 16 | 17 | 37 | 13 | 26 |
| 10" Gel | 8 | 9 | 18 | 7 | 10 |
| 10' Gel | 8 | 13 | 19 | 7 | 11 |
| STI | 9.3 | 19.5 | 27.7 | 17.9 | 18.5 |
| LSRV | 20,300 | 40,600 | 70,700 | 33,800 | 39,600 |
| ES | 579 | 1075 | 809 | 459 | 658 |
| SSI | 98 | 98 | 97.6 | 96.5 | 97.3 |

[1]% by weight of aqueous phase

TABLE 2

Fluid Composition: 225.4 ml Biobase internal olefin; 6 g of Synvert organophilic clay viscosifier; indicated concentrations of Synvert I, Synvert II, and Conditioner; 3 g FLG fluid loss additive; 65.1 ml of 12.5% by weight PEG 8000 aqueous solution; 4 g lime; and 250 g barite.

| Fluid | 2-1 | 2-2 | 2-3 | 2-4 | 2-5 | 2-6 | 2-7 | 2-8 |
|---|---|---|---|---|---|---|---|---|
| Synvert, I, ml | 5.5 | 5.5 | 5.5 | 5.5 | 5.5 | 11.0 | 11.0 | 11.0 |
| Synvert II, ml | 3.7 | 3.7 | 7.4 | 7.4 | 7.4 | 0 | 0 | 0 |
| Conditoner, ml | 3.0 | 6.0 | 0 | 3.0 | 6.0 | 0 | 3.0 | 6.0 |
| Fann Rheology | | | | | | | | |
| 600 rpm | 74 | 91 | 87 | 92 | 78 | 88 | 89 | 90 |
| 300 rpm | 51 | 59 | 57 | 60 | 51 | 59 | 61 | 60 |
| 200 rpm | 41 | 47 | 45 | 49 | 41 | 48 | 51 | 49 |
| 100 rpm | 29 | 35 | 31 | 32 | 29 | 35 | 37 | 36 |
| 6 rpm | 12 | 15 | 10 | 13 | 12 | 15 | 18 | 16 |
| 3 rpm | 11 | 14 | 9 | 12 | 11 | 14 | 16 | 15 |

TABLE 2-continued

Fluid Composition: 225.4 ml Biobase internal olefin; 6 g of Synvert organophilic clay viscosifier; indicated concentrations of Synvert I, Synvert II, and Conditioner; 3 g FLG fluid loss additive; 65.1 ml of 12.5% by weight PEG 8000 aqueous solution; 4 g lime; and 250 g barite.

| Fluid    | 2-1    | 2-2    | 2-3    | 2-4    | 2-5    | 2-6    | 2-7    | 2-8    |
|----------|--------|--------|--------|--------|--------|--------|--------|--------|
| PV       | 23     | 32     | 30     | 32     | 27     | 29     | 28     | 30     |
| YP       | 28     | 27     | 27     | 28     | 24     | 30     | 33     | 30     |
| 10" Gel  | 12     | 14     | 9      | 12     | 11     | 14     | 16     | 15     |
| 10' Gel  | 13     | 15     | 16     | 13     | 12     | 15     | 17     | 16     |
| STI      | 21.6   | 23.7   | 15.8   | 20.0   | 21.6   | 23.7   | 26.2   | 25.0   |
| LSRV     | 39,700 | 48,200 | 33,300 | 40,200 | 45,600 | 53,800 | 52,600 | 50,200 |
| ES       | 861    | 1068   | 790    | 1206   | 1161   | 1050   | 981    | 1065   |

TABLE 3A

INITIAL RHEOLOGY

| Fluid | Comparative B | 3-1 | 3-2 | 3-3 | 3-4 | 3-5 | 3-6 |
|---|---|---|---|---|---|---|---|
| Aqueous Phase | | | | | | | |
| $CaCl_2$, %[1] | 28 | 0 | 0 | 0 | 0 | 0 | 0 |
| PEG, %[1] | 0 | 12.5 | 22.2 | 12.5 | 22.2 | 12.5 | 22.2 |
| PEG, MW | 0 | 1450 | 1450 | 3350 | 3350 | 8000 | 8000 |
| Fann Rheology | | | | | | | |
| 600 rpm | 91 | 78 | 74 | 84 | 73 | 80 | 65 |
| 300 rpm | 58 | 53 | 51 | 60 | 49 | 54 | 43 |
| 200 rpm | 46 | 43 | 41 | 50 | 39 | 44 | 34 |
| 100 rpm | 31 | 33 | 3 | 38 | 29 | 33 | 25 |
| 6 rpm | 10 | 16 | 16 | 20 | 14 | 17 | 14 |
| 3 rpm | 8 | 14 | 14 | 18 | 13 | 15 | 13 |
| PV | 33 | 25 | 23 | 24 | 24 | 26 | 22 |
| YP | 25 | 28 | 28 | 36 | 25 | 28 | 21 |
| 10" Gel | 12 | 15 | 16 | 19 | 15 | 16 | 16 |
| 10' Gel | 20 | 18 | 21 | 21 | 19 | 21 | 21 |
| STI | 134.8 | 26.3 | 27.5 | 30.0 | 26.5 | 27.8 | 30.2 |
| LSRV ($\times 10^{-2}$) | 540 | 440 | 491 | 551 | 590 | 700 | 495 |

[1]% by weight of the aqueous phase

TABLE 3B

PROPERTIES AFTER HOT ROLLING AT 65.6° C. FOR 16 HOURS

| Fluid | Comparative B | 3-1 | 3-2 | 3-3 | 3-4 | 3-5 | 3-6 |
|---|---|---|---|---|---|---|---|
| Fann Rheology | | | | | | | |
| 600 rpm | 84 | 69 | 67 | 67 | 60 | 62 | 60 |
| 300 rpm | 47 | 43 | 44 | 40 | 35 | 36 | 35 |
| 200 rpm | 33 | 34 | 35 | 29 | 26 | 27 | 25 |
| 100 rpm | 19 | 24 | 25 | 19 | 17 | 18 | 16 |
| 6 rpm | 3 | 12 | 13 | 8 | 8 | 9 | 7 |
| 3 rpm | 2 | 11 | 12 | 7 | 7 | 8 | 6 |
| PV | 37 | 26 | 23 | 27 | 25 | 16 | 25 |
| YP | 10 | 17 | 21 | 13 | 10 | 20 | 10 |
| 10" Gel | 3 | 13 | 15 | 12 | 11 | 12 | 11 |
| 10' Gel | 16 | 17 | 20 | 17 | 17 | 18 | 15 |
| STI | 4.3 | 25.6 | 27.3 | 17.5 | 20.0 | 22.2 | 17.1 |
| LSRV ($\times 10^{-2}$) | 132 | 412 | 405 | 361 | 380 | 420 | 334 |
| ES | 626 | 463 | 358 | 429 | 423 | 490 | 445 |
| HTHP | 5.5 | 5.0 | 2.75 | 4.0 | 9.0 | 10.5 | 7.25 |
| SSI | 98.0 | 97.1 | 97.6 | 97.2 | 96.6 | 97.2 | 97.5 |

What is claimed is:

1. An invert emulsion well drilling and servicing fluid comprising a continuous oil phase, an internal aqueous phase, the aqueous phase comprising a solution of a polyethyleneglycol dissolved in water, and one or more emulsifiers, the emulsifier being present in an amount effective to disperse the aqueous phase in the continuous oil phase.

2. The fluid of claim 1 wherein the polyethyleneglycol is present in the aqueous phase at a concentration of from about 5 to about 40 percent by weight.

3. The fluid of claim 1 wherein the polyethyleneglycol is present in the aqueous phase at a concentration of from about 7.5% to about 35% by weight.

4. The fluid of claim 1 wherein the polyethyleneglycol is present in the aqueous phase at a concentration of from about 10% to about 30% by weight.

5. The fluid of claim 1, 2, 3 or 4 wherein the continuous oil phase is present in a volume ratio to the internal aqueous phase of from about 40:60 to about 95:5.

6. The fluid of claim 1, 2, 3, or 4 wherein the continuous oil phase is present in a volume ratio to the internal aqueous phase of from about 60:40 to about 85:15.

7. The fluid of claim 1, 2, 3, or 4 wherein the polyethylene glycol has a molecular weight from about 500 to about 10,000.

8. The method of enhancing the thermal stability of a water-in-oil emulsion well drilling and servicing fluid wherein the fluid comprises a continuous oil external phase and an internal aqueous phase emulsified therein, the fluid containing one or more emulsifiers therein, which comprises adding to the fluid a water soluble polyethyleneglycol in an amount sufficient to increase the low shear rate viscosity and Shear Thinning Index of the fluid upon heating the fluid at elevated temperatures.

9. The method of claim 8 wherein the polyethyleneglycol is dissolved in the aqueous phase prior to emulsification of the aqueous phase into the oil.

10. The method of claim 8 or 9 wherein the polyethyleneglycol is present in the aqueous phase at a concentration of from about 7.5% to about 35% by weight.

11. The method of claim 8 or 9 wherein the polyethyleneglycol is present in the aqueous phase at a concentration of from about 10% to about 30% by weight.

12. The method of claim 8 or 9 wherein the continuous oil phase is present in a volume ratio to the internal aqueous phase of from about 60:40 to about 85:15.

13. The method of claim 8 or 9 wherein the polyethylene glycol has a molecular weight from about 500 to about 10,000.

14. The method of claim 8 or 9 wherein the polyethyleneglycol is present in the aqueous phase at a concentration of from about 7.5% to about 35% by weight and wherein the continuous oil phase is present in a volume ratio to the internal aqueous phase of from about 60:40 to about 85:15.

15. The method of claim 8 or 9 wherein the polyethyleneglycol is present in the aqueous phase at a concentration of from about 10% to about 30% by weight and wherein the continuous oil phase is present in a volume ratio to the internal aqueous phase of from about 60:40 to about 85:15.

16. The method of claim 8 or 9 wherein the polyethyleneglycol is present in the aqueous phase at a concentration of from about 7.5% to about 35% by weight and wherein the polyethylene glycol has a molecular weight from about 500 to about 10,000.

17. The method of claim 8 or 9 wherein the polyethyleneglycol is present in the aqueous phase at a concentration of from about 10% to about 30% by weight and wherein the polyethylene glycol has a molecular weight from about 500 to about 10,000.

18. The method of claim 8 or 9 wherein the polyethyleneglycol is present in the aqueous phase at a concentration of from about 7.5% to about 35% by weight, wherein the continuous oil phase is present in a volume ratio to the internal aqueous phase of from about 60:40 to about 85:15, and wherein the polyethylene glycol has a molecular weight from about 500 to about 10,000.

19. The method of claim 8 or 9 wherein the polyethyleneglycol is present in the aqueous phase at a concentration of from about 10% to about 30% by weight, wherein the continuous oil phase is present in a volume ratio to the internal aqueous phase of from about 60:40 to about 85:15 and wherein the polyethylene glycol has a molecular weight from about 500 to about 10,000.

* * * * *